(12) United States Patent
Brack et al.

(10) Patent No.: US 10,786,773 B2
(45) Date of Patent: Sep. 29, 2020

(54) FILTER ELEMENT

(71) Applicant: Carl Freudenberg KG, Weinheim (DE)

(72) Inventors: Regina Brack, Mannheim (DE); Uwe Haefner, Kehl (DE); Alexander Oelsner, Mannheim (DE)

(73) Assignee: CARL FREUDENBERG KG, Weinheim (DE)

( * ) Notice: Subject to any disclaimer, the term of this patent is extended or adjusted under 35 U.S.C. 154(b) by 182 days.

(21) Appl. No.: 15/818,812

(22) Filed: Nov. 21, 2017

(65) Prior Publication Data

US 2018/0154298 A1 Jun. 7, 2018

(30) Foreign Application Priority Data

Dec. 7, 2016 (EP) .................................. 16202649

(51) Int. Cl.
| | | |
|---|---|---|
| *B01D 46/00* | (2006.01) | |
| *B01D 46/52* | (2006.01) | |
| *B01D 39/14* | (2006.01) | |
| *B60H 3/06* | (2006.01) | |
| *B01D 46/10* | (2006.01) | |

(52) U.S. Cl.
CPC ........... *B01D 46/521* (2013.01); *B01D 39/14* (2013.01); *B01D 46/0002* (2013.01); *B01D 46/0005* (2013.01); *B01D 46/0036* (2013.01); *B01D 46/10* (2013.01); *B60H 3/06* (2013.01); *B01D 2239/0407* (2013.01); *B01D 2239/065* (2013.01); *B01D 2275/10* (2013.01); *B01D 2279/40* (2013.01)

(58) Field of Classification Search
CPC ............... B01D 46/00; B01D 46/0002; B01D 46/0005; B01D 46/0036; B01D 46/10; B01D 46/521; B01D 46/523; B01D 39/14; B01D 2239/0407; B01D 2239/065; B01D 2275/10; B01D 2279/40; B60H 3/06
USPC ............................................ 55/419–519, 524
See application file for complete search history.

(56) References Cited

U.S. PATENT DOCUMENTS

| | | | | |
|---|---|---|---|---|
| 2006/0000197 A1* | 1/2006 | Haefner | ................. | B01D 46/10 55/521 |
| 2006/0281399 A1* | 12/2006 | Brauer | .................. | B01D 46/10 454/187 |
| 2009/0205300 A1* | 8/2009 | Pfeuffer | ................. | B01D 46/02 55/365 |

FOREIGN PATENT DOCUMENTS

| | | |
|---|---|---|
| DE | 1782600 A1 | 9/1971 |
| DE | 19530435 A1 | 2/1997 |
| DE | 10320260 A1 | 10/2004 |
| DE | 102008024412 A1 | 1/2010 |
| EP | 0983784 A2 | 3/2000 |
| JP | 2006271567 A * | 10/2006 |
| JP | 2006271567 A | 10/2006 |

* cited by examiner

*Primary Examiner* — T. Bennett McKenzie
(74) *Attorney, Agent, or Firm* — Leydig, Voit & Mayer, Ltd.

(57) ABSTRACT

In an embodiment, the present invention provides a filter element including: a bellows in the shape of a zig-zag having pleat walls and a pleat ridge, edges of the pleat walls and the pleat ridge being provided with edge elements; and a frame element being assigned to at least one end pleat of the bellows. The frame element surrounds the end pleat so as to form a positive fit on both sides, the frame element being fixed to the edge elements.

9 Claims, 6 Drawing Sheets

FILTER ELEMENT

CROSS-REFERENCE TO PRIOR APPLICATION

Priority is claimed to European Patent Application No. EP 16 202 649.6, filed on Dec. 7, 2016, the entire disclosure of which is hereby incorporated by reference herein.

FIELD

The invention relates to a filter element comprising a bellows in the shape of a zig-zag having pleat walls and a pleat ridge, the edges of the pleat walls and the pleat ridge being provided with an edge element, and a frame element being assigned to at least one end pleat of the bellows.

BACKGROUND

Filter elements of this type comprise a flat filtering material, which has been shaped like a zig-zag in a device in order to increase the filtration surface area. Pleat walls are thus formed, which are inclined with respect to one another and are each delimited by a pleat ridge. An edge element is attached to the edges of the pleat walls and the pleat ridge so as to be transverse to the pleat ridge, and is most often integrally fastened to the edges. A filter element of this type is most commonly box-shaped. The edge elements create, on the one hand, dimensional stability for the filter element and, on the other hand, a seal that prevents contaminated inlet air from being able to flow around the filter element inside the filter housing in which the filter element is arranged.

In this case, it is particularly simple to arrange an edge element on the sides to which the edges are assigned. An edge element cannot simply be arranged on the two end faces of the filter element that are each delimited by an end pleat or an end pleat edge. The flexible nature of the end pleat makes it difficult to fasten the edge element thereto. Furthermore, the filter element may not be sufficiently sealed at the two end faces.

In general, frame elements made of a thermoplastic basic material or elastomeric material are known. However, these are complex to produce.

DE 10 2008 024 412 A1 discloses a filter element, in which a frame element is assigned to the end pleats of the bellows. In this case, the frame element is integrally bonded to the end pleat. The additional production step of integrally bonding the frame element is comparatively complex.

SUMMARY

In an embodiment, the present invention provides a filter element comprising: a bellows in the shape of a zig-zag having pleat walls and a pleat ridge, edges of the pleat walls and the pleat ridge being provided with edge elements; and a frame element being assigned to at least one end pleat of the bellows, wherein the frame element surrounds the end pleat so as to form a positive fit on both sides, the frame element being fixed to the edge elements.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
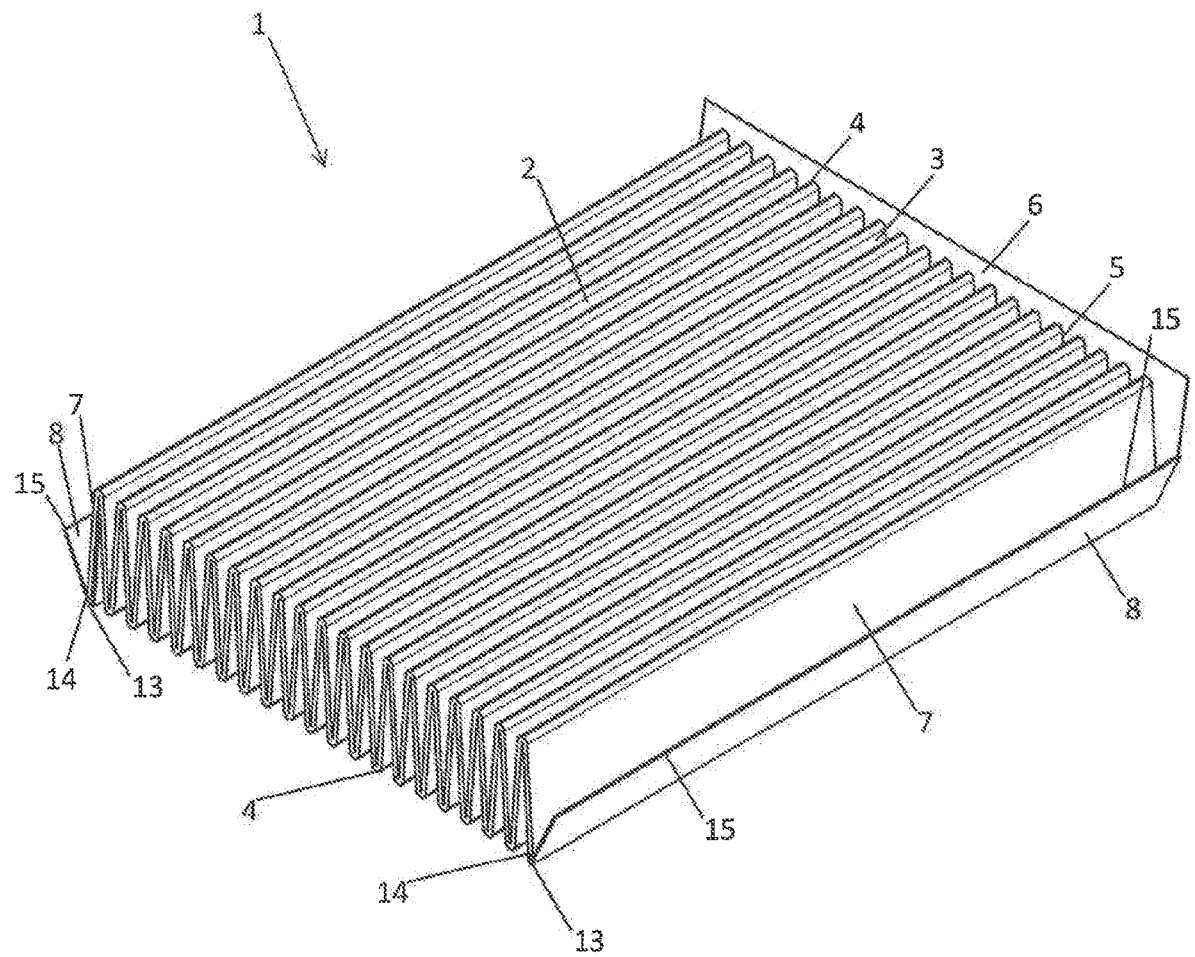
FIG. 1 is a schematic sectional view of a filter element.

In an embodiment of the filter element of the present invention, the frame element surrounds the end pleats so as to form a positive fit on both sides, the frame element being fixed to the edge elements.

In this case, the frame element surrounds the first main side of the end pleat, which faces away from the bellows, the longitudinal edge of the end pleat and the second main side of the end pleat, which faces the bellows. The frame element is preferably V-shaped, the end pleat being inserted into the frame element, thus forming a positive fit. In this case, the longitudinal edge of the end pleat is assigned to the tip of the V-shaped frame element that extends in the longitudinal direction.

The frame element is preferably integrally bonded to the edge elements so that the frame element is firmly integrated in the filter element. As a result of the positive connection between the frame element and the end pleat, the end pleat is securely fixed in position and the filter element is also securely sealed at the end faces.

The frame element is particularly preferably only integrally bonded to the edge elements. This simplifies the production of the filter element, since, even when the filter element is provided with an additional frame element, an integral bond only needs to be provided at the edges.

Since the frame element is only positively connected to the end pleat, the frame element has greater movability, thus creating a better seal at the end faces of the filter element in a filter housing.

The edge elements are then preferably bonded to the bellows and to the frame elements by means of an integral bond. This can be produced by ultrasonic welding or by an adhesive connection. A preferred adhesive connection is produced using a hot-melt adhesive. In the filter element according to the invention, an adhesive only needs to be applied at the edges of the bellows that extend transversely to the pleat ridge, thus simplifying production of the bellows.

The bellows can be made of a nonwoven fabric. Nonwoven fabrics are particularly suitable and tried-and-tested materials for filter elements. In this case, the bellows can be made up of several layers. Layers having different filtering properties can thus be combined.

The bellows can comprise at least one layer of sorptive particles. In this case, particles made of activated carbon in particular can be used as the sorptive particles. Sorptive particles absorb undesirable gaseous components from the inlet air to be filtered. This improves the air quality of the inlet air to be filtered.

The layer comprising the sorptive particles is preferably embedded between additional filter layers. The additional filter layers are preferably made of nonwoven fabric. Due to this layered arrangement, the particles are captively embedded in the bellows.

In an alternative embodiment, the bellows comprises two layers of sorptive particles, which are separated from one another by a layer of nonwoven fabric. Such a bellows correspondingly comprises five filter layers.

The circumferential edge assigned to the layer comprising the sorptive particles can be sealed. This can prevent sorptive particles from percolating out of the layer along the edge. The edge seal can, for example, be formed by the layers surrounding the layer containing the sorptive particles being integrally bonded to one another at the edges. As a result, an edge seal is formed. This can be produced by ultrasonic welding, for example. Alternatively, the circumferential edge can also be sealed by means of an adhesive, for example a holt-melt adhesive. In conjunction with the positive arrangement of the frame element in the region of the end pleat in particular, as per the invention, the edge seal is advantageous since the frame element does not protect the sorptive particles from percolating out due to the positive bond thereof.

The frame element is preferably made of nonwoven fabric. As a result, the frame element is inexpensive and is made of a similar material to the bellows, which simplifies the subsequent disposal of the filter element. Furthermore, a frame element made of nonwoven fabric is lightweight and flexible, thus creating a better seal at the end faces of the filter element.

A film hinge can be formed from the frame element and is assigned to the longitudinal edge of the end pleat. The film hinge is therefore assigned to the tip of the V-shaped frame element. The film hinge makes it easier to bend a planar frame element to form the V-shaped frame element that surrounds the end pleat of the bellows. Furthermore, the film hinge creates a defined edge or a tip of the frame element, which is convex and thus acts as a sealing edge, and which linearly rests against the filter housing with resilient pretension and seals the end faces of the bellows with respect to the filter housing.

If the bellows is made up of several layers or if the filter layer is very thick, depending on the thickness of the bellows, it may be expedient to place two or more film hinges in the frame element so that a portion of the frame element between the two film hinges rests against the longitudinal edge of the end pleat in a positive fit. In this embodiment, at least the film hinge facing away from the bellows acts as a sealing edge.

The frame element can be designed to concavely bulge toward the side facing away from the bellows. Since the frame element is bonded to the edge elements, the frame element is bulged in an arcuate shape so that, once the filter element has been inserted into a filter housing, it sealingly rests against the filter housing with resilient pretension in the region of the frame element. This improves the sealing effect at the end faces of the filter element.

The bulge can be formed by the frame element being of a larger size than the end pleat. In this embodiment, prior to assembly, the longitudinal extent of the frame element is greater than the longitudinal extent of the bellows in the region of the end pleat. After assembly, the frame element is deformed such that it has the same longitudinal extent as the end pleat. The frame element is thereby concavely bulged.

In one advantageous embodiment, the extent of the end pleat can be shorter than the extent of the pleat walls of the bellows. This means that the frame element can be designed so that both the film hinge and the pleat ridge extend in the same horizontal plane, in parallel with the outer edge of the edge element.

The bellows can be formed as a small bellows. A small bellows is wherein it has a desired size before the edge elements and the frame element are attached to the bellows in order to produce a filter element. The zig-zag shape of a small bellows is mostly produced with the aid of heat. The pleats thus produced retain their shape very well. However, this is disadvantageous in that the bellows is only slightly convexly bulged at the end pleat. This drawback can, however, be compensated for by the embodiment of the frame element according to the invention. The convex bulge is formed from the frame element, which assumes the sealing function at the end faces of the filter element.

The filter element can be formed as a cabin filter for mobile applications, in particular in motor vehicles in this case. The filter element according to the invention is particularly compact and has a high filtering capacity, the sealing function of the frame element preventing undesirable bypass flows. As a result, the filter element is particularly suitable for mobile applications.

A filter element according to an alternative embodiment comprises a bellows in the shape of a zig-zag having pleat walls and a pleat ridge, the edges of the pleat walls and the pleat ridge being provided with edge elements, and a frame element being assigned to at least one end pleat of the bellows, the frame element being of a larger size than the longitudinal extent of the end pleat.

In this embodiment, the frame element is also assigned to the end pleat. In this case, the frame element is, however, only assigned to just one main side of the end pleat and is correspondingly arranged on either the main side of the end pleat that faces away from the bellows or on the main side of the end pleat that faces the bellows. The frame element is integrally bonded to the edge elements. Due to the larger size, the frame element convexly bulges after being clamped between the edge elements and thus improves the sealing effect of the filter element at the end faces. In this case, the frame element can form its own sealing edge when the frame element is mounted on the main side of the end pleat that faces away from the bellows. Alternatively, when the frame element is arranged on the main side of the end pleat that faces the bellows, the bulge of the frame element can also press the end pleat against the filter housing.

The frame element is preferably rectangular. Furthermore, the frame element is preferably made of a nonwoven fabric.

FIGS. 1 to 4 show a filter element 1 comprising a bellows 2 in the shape of a zig-zag having pleat walls 3 and a pleat ridge 4. In order to produce the bellows, a planar filtering material is shaped like a zig-zag, whereby the pleat walls 3 are inclined with respect to one another. The edges 5 of the pleat walls 3 and the pleat ridge 4 are provided with edge elements 6. In the present embodiment, the edge elements 6 are rectangular. The regions of the filter element 1 comprising the edge elements 6 form side walls. The bellows 2 and the edge elements 6 are connected by means of a hot-melt adhesive.

The pleat walls 3, which are not connected to any other pleat walls and whose pleat ridge 4 forms an edge extending in the longitudinal direction, form end pleats 7. Frame elements 8 are assigned to the end pleats 7 of the bellows. The end pleats 7 comprising the frame elements 8 form the end faces of the filter element 1. In this case, the frame elements 8 are formed from a separate element. The frame elements 8 surround the end pleat 7, forming a positive fit on both sides, the frame elements 8 being fixed to the edge elements 6. For this purpose, the frame elements 8 are V-shaped and are placed on the end pleats 7 so that the frame elements 8 surround portions of the end pleats 7 on the two main sides thereof. The tips of the V-shaped frame elements 8 are assigned to the longitudinal edges 14 of the end pleats 7.

In this case, the frame elements 8 are only integrally bonded to the edge elements 6. Here, this bond is produced by gluing frame elements 8 and edge elements 6 together by means of a hot-melt adhesive.

The bellows 2, the edge elements 6 and the frame elements 8 are made of a nonwoven fabric. In this case, the bellows 2 is formed as a small bellows. A small bellows consists of a planar element that has been cut to size and is transformed into the folded shape of the bellows 2.

The filter element 1 is formed as a cabin filter for mobile applications, in particular as a cabin air filter for motor vehicles.

In the embodiment according to FIG. 1, the bellows 2 of the filter element 1 consists of one layer.

Figure 2:
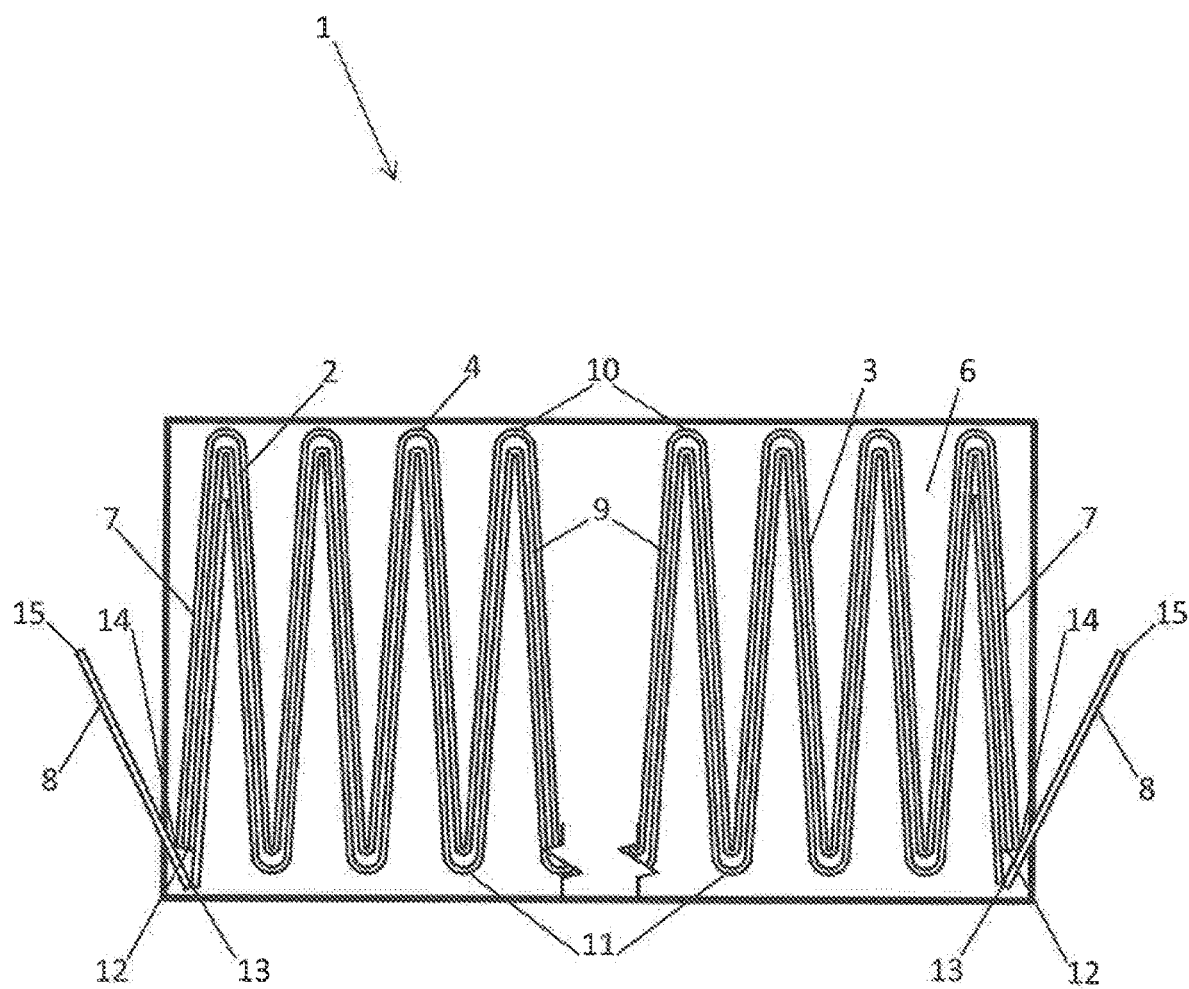
FIG. 2 is a schematic sectional view of a filter element comprising a multilayer bellows.

FIG. 2 shows an alternative embodiment of the filter element 1 depicted in FIG. 1, the bellows 2 being made up of several layers. In this embodiment, a layer 9 of the bellows 2 comprises sorptive particles. The sorptive particles comprise activated carbon. In this case, the layer 9 comprising the sorptive particles is embedded between additional layers 10, 11 made of nonwoven fabric. The edge 12 assigned to the layer 9 comprising the sorptive particles is sealed in order to securely fix the sorptive particles in position in the layer 9 comprising the sorptive particles. For this purpose, the layers 10, 11 are integrally bonded to one another. The layers 9, 10, 11 can be integrally bonded by means of ultrasonic welding or by means of an additional adhesive, preferably a hot-melt adhesive.

Figure 3:
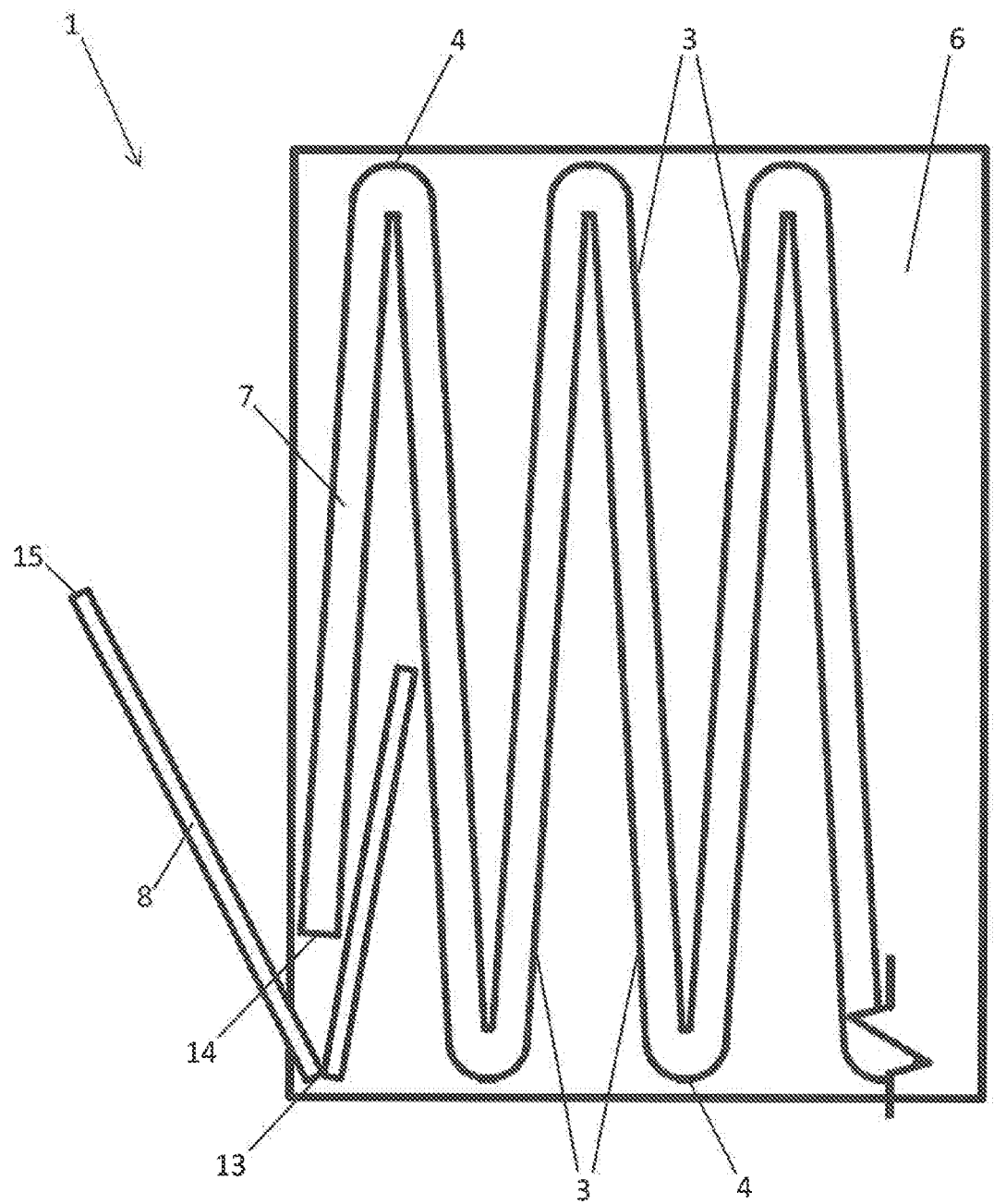
FIG. 3 is a schematic detailed view of the filter element in the region of an end pleat.

FIG. 3 is a detailed view of the filter element 1 in the region of an end pleat 7. A film hinge 13 is formed from the V-shaped frame element 8 that surrounds the end pleat 7 of the bellows 2. In this case, the film hinge 13 is assigned to the V-shaped tip of the frame element 8, which is in turn assigned to the longitudinal edge 14 of the end pleat 7 of the bellows 2. In the embodiment according to FIG. 3, the extent of the end pleat 7 is shorter than the pleat ridge 4 of the bellows 2. As a result, the film hinge 13 of the frame element 8 is arranged in the same horizontal plane as the pleat ridge 4 of the bellows 2.

Figure 4:
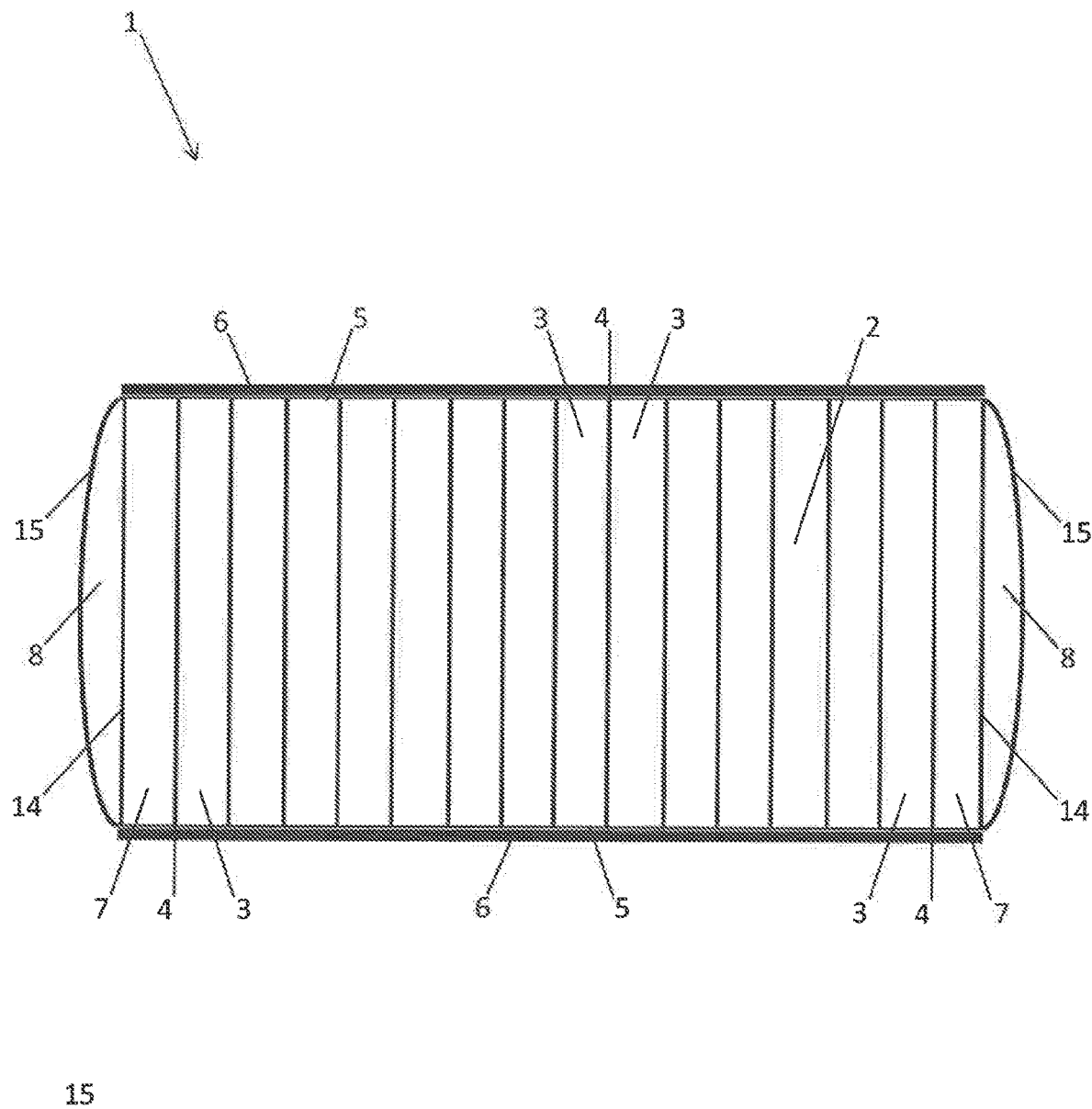
FIG. 4 is a schematic plan view of a filter element.

FIG. 4 is a plan view of a filter element 1. Said drawing shows that the frame element 8 is designed to concavely bulge toward the side facing away from the bellows 2. The bulge is formed from the frame element 8 being of a larger size than the longitudinal extent of the end pleat 7. The frame element 8 is convexly bulged when the bellows 2 and the frame elements 8 are connected to the edge elements 6. The edge of the frame element 8 protruding from the bellows 2 forms a sealing edge 15 in this case.

Figure 5:
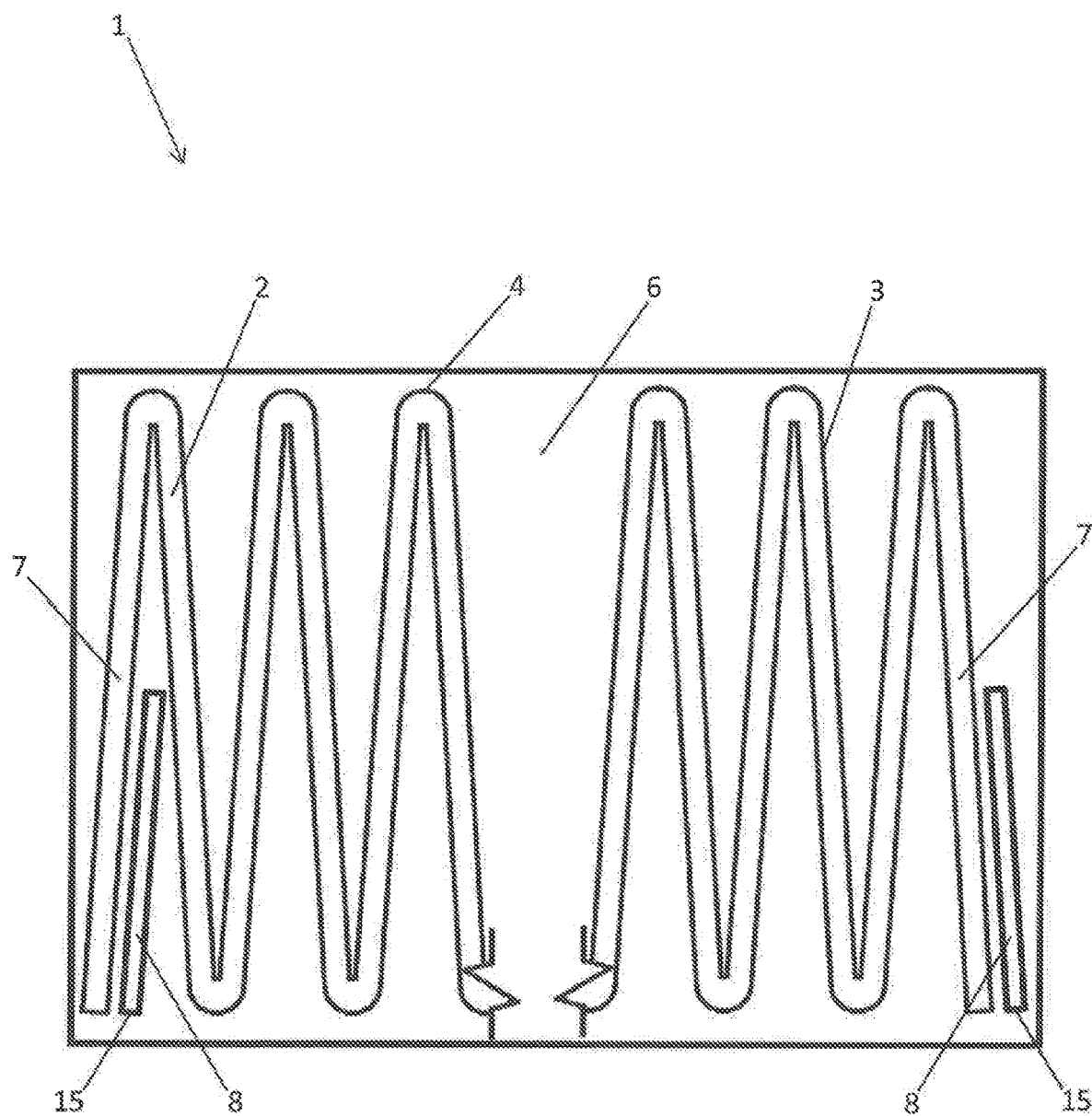
FIG. 5 is a schematic view of an alternative filter element.

FIG. 5 shows an alternative filter element 1. The filter element 1 comprises a bellows 2 in the shape of a zig-zag having pleat walls 3 and a pleat ridge 4, the edges 5 of the pleat walls 3 and the pleat ridge 4 being provided with edge elements 6, and a frame element 8 being assigned to at least one end pleat 7 of the bellows 2, the frame element 8 being of a larger size than the longitudinal extent of the end pleat 7. The frame element 8 is made of a nonwoven fabric and is only integrally bonded to the edge elements 6 by means of a hot-melt adhesive. On one of the end faces, the frame element 8 is arranged on the main side of the end pleat 7 that faces away from the bellows 2. On the other end face, the frame element 8 is arranged on the main side of the end pleat 7 that faces the bellows 2.

The embodiment of the bellows 2 and of the edge elements 6 corresponds to the filter elements 1 shown in FIGS. 1 to 4.

Figure 6:
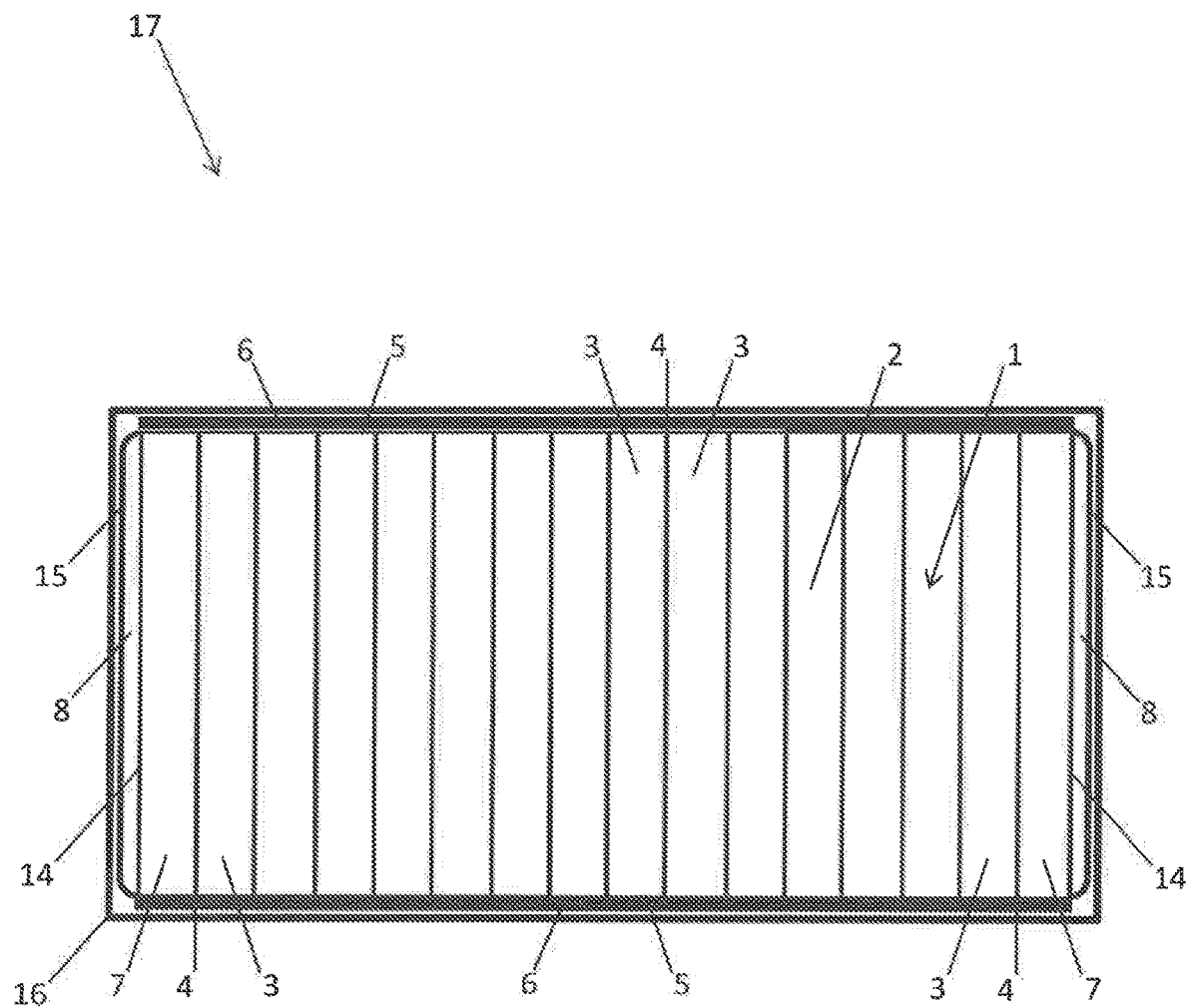
FIG. 6 is a schematic view of a filter arrangement comprising a filter element and a filter housing.

FIG. 6 shows a filter arrangement 17 comprising a filter element 1, as already depicted in the drawings, and a filter housing 16. The filter element 1 is inserted into the filter housing 16, the edge elements 6 sealing the side walls of the filter element 1 with respect to the filter housing 16. The frame elements 8 seal the end faces of the filter element 1 with respect to the filter housing 16. The frame elements 8 sealingly rest against the filter housing 16 by means of their sealing edges 15 with resilient pretension.

The inlet air preferably flows through the filter arrangement 17 such that the inlet air flows toward the leg of the V-shaped frame elements 8. In this case, excess pressure is formed between the legs of the frame elements 8, leading to the legs of the frame elements 8 spreading apart. As a result, the pressure at which the sealing edge 15 presses against the filter housing 16 is increased, creating a better seal.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A filter element comprising:
   a bellows in the shape of a zig-zag having pleat walls and a pleat ridge, edges of the pleat walls and the pleat ridge being provided with edge elements; and
   a frame element being assigned to at least one end pleat of the bellows,
   wherein the frame element surrounds the end pleat so as to form a positive fit on both sides, the frame element being fixed to the edge elements in that the frame element is integrally bonded only to the edge elements,
   wherein the frame element comprises a nonwoven fabric, and
   wherein the frame element is configured to concavely bulge toward a side facing away from the bellows.

2. The filter element of claim 1, wherein the bellows is comprised of a nonwoven fabric.

3. The filter element of claim 1, wherein the bellows comprises a plurality of layers.

4. The filter element of claim 3, wherein at least one layer of the plurality of layers comprises sorptive particles.

5. The filter element of claim 4, wherein the at least one layer comprising the sorptive particles is embedded between other layers of the plurality layers, and
   wherein the other layers are comprised of nonwoven fabric.

6. The filter element of claim 5, wherein an edge assigned to the at least one layer comprising the sorptive particles is sealed.

7. The filter element of claim 1, further comprising a film hinge formed from the frame element, the film hinge being assigned to a longitudinal edge of the end pleat.

8. The filter element of claim 1, wherein the frame element is of a larger size than a longitudinal extent of the end pleat.

9. The filter element of claim 1, wherein the filter element is formed as a cabin filter for mobile applications.

\* \* \* \* \*